(12) United States Patent
Prinsen et al.

(10) Patent No.: US 7,467,642 B2
(45) Date of Patent: Dec. 23, 2008

(54) SOFT VENTABLE RELIEF VALVE

(75) Inventors: Todd Prinsen, Sarasota, FL (US); Bernd Zahe, Linnich (DE)

(73) Assignee: Sun Hydraulics Corp., Sarasota, FL (US)

( * ) Notice: Subject to any disclaimer, the term of this patent is extended or adjusted under 35 U.S.C. 154(b) by 448 days.

(21) Appl. No.: 11/359,653

(22) Filed: Feb. 21, 2006

(65) Prior Publication Data

US 2006/0201554 A1   Sep. 14, 2006

(51) Int. Cl.
F16K 17/10 (2006.01)

(52) U.S. Cl. .................... 137/491; 137/492.5

(58) Field of Classification Search .............. 137/489.5, 137/490, 491, 492.5, 494
See application file for complete search history.

(56) References Cited

U.S. PATENT DOCUMENTS

| 4,653,527 A | 3/1987 | Kosarzecki |
| 4,742,846 A | 5/1988 | DiBartolo |
| 4,795,129 A | 1/1989 | Clark |
| 5,050,636 A | 9/1991 | Sagawa et al. |
| 5,381,823 A | 1/1995 | DiBartolo |
| 6,039,070 A * | 3/2000 | Zaehe ......................... 137/491 |
| 6,119,722 A * | 9/2000 | Zaehe ......................... 137/494 |
| 6,640,830 B2 * | 11/2003 | Zahe .......................... 137/491 |
| 2003/0106588 A1 * | 6/2003 | Zahe .......................... 137/491 |

* cited by examiner

Primary Examiner—Stephen M. Hepperle
Assistant Examiner—William McCalister
(74) Attorney, Agent, or Firm—Charles J. Prescott

(57) ABSTRACT

A pilot operated pressure valve which limits the rate of pressure rise and substantially eliminates excessive system and tank pressure spikes. Because the pilot ball downstream of the damping orifice is held off the pilot seat in the normal starting condition by a pilot return spring, the main piston will open immediately when system pressure overcomes the low bias pressure of the main spring. A pilot pressure bypass port, which selectively deactivates the pilot chamber features, may also be included.

6 Claims, 5 Drawing Sheets

US 7,467,642 B2

SOFT VENTABLE RELIEF VALVE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to pressure control valves in hydraulic systems, and more particularly to a soft ventable relief valve which eliminates pressure spikes and hydraulic shock in such systems.

2. Description of Related Art

Pressure relief valves are used to provide a quick opening for excessive hydraulic pressure in a hydraulic system into which the valve is installed. These valves are characterized by a structure by which hydraulic pressure in the system is regulated by relieving and venting some of the pressurized fluid back to a supply tank or reservoir.

All conventional relief valves such as a differential piston relief valve or a pilot operated relief valve have a significant shortcoming when installed into a hydraulic system. When the hydraulic system is actuated so as to energize a hydraulic actuator, cylinder or motor, pressure increases virtually instantaneously. As a result, there is a sharp hydraulic spike in the pressure level of the fluid system which results in excessively abrupt energizing of the hydraulic motor. Not only is this operational limitation abusive to the system, but it may also be operationally detrimental in that the equipment being operated will exhibit too sharp a start-up.

Other patented relief valves claiming a "soft start" feature are disclosed in U.S. Pat. No. 4,653,527 to Kosarzecki, in U.S. Pat. No. 5,050,636 invented by Sagawa and in U.S. Pat. No. 5,381,823 invented by DiBartolo. In each of these prior art valves, pressurized fluid flow into the valve acts to move an internal piston that further loads a spring which increases the maximum operating pressure setting of the valve.

A general technical problem with the above relief valves concerns the principal embodied in each that depends upon a very high pressure drop across a pilot orifice which varies somewhat proportional to inlet pressure. At high inlet pressure and at sudden pressure increases, the setting of the valve increases much faster than at a low pressure having a slower pressure increase. In order to realize technically reasonable flows, Kosarzecki and DiBartolo both reduce the effective throttle diameter by using a wire or pin in a hole thus creating a very small ring area. However, the flow across such arrangements is viscosity sensitive.

The friction of the moveable piston in each of these devices is a source of yet another problem in loading the pilot spring to increase the operating pressure. The moveable piston must seal high pressure against the low pressure both existing simultaneously within these prior art valves. DiBartolo uses two seals that see the full pressure drop across the valve. The resulting friction drastically affects the performance of the valve. Thus, DiBartolo had to increase the effective area of the piston that loads the pilot spring. By this arrangement, the piston begins increasing the operating pressure setting of the valve at pressures much lower than the actual inlet pressure of the system. As a result, the valve is often prematurely set at a maximum setting thus having lost its damping or "soft start" feature altogether.

Kosarzecki reduced the friction of that valve by using a spool type piston without rubber seals. Although this device reduces the friction to a high degree, Kosarzecki still recommends an effective area for the spring-loaded piston that is ten percent (10%) greater than the effective area for the main piston. As a result, the setting of the valve is ten percent higher than the actual pressure if the inlet pressure remains steady for a period of time. Moreover, at sudden pressure increases, the Kosarzecki valve is closed first and pressure peaks cannot be eliminated. Further, this valve works only for a flow path which is "side-to-nose" which means that the operating pressure at the side of the valve is relieved to the nose thereof. The preferred flow path for cartridge valve is "nose-to-side" for many practical reasons.

The Sagawa patent reduces the friction at the loading piston by also using a spool-type piston without rubber seals. However, Sagawa also uses a differential area for this system so that the two diameters of the piston and the spool require very accurate manufacturing and concentricity.

These prior art soft start valves are direct acting relief valves. In contrast, the present invention is a pilot operated relief valve. As in other pilot operated relief valves, the pressure in the pilot chamber is much lower than the controlled pressure, but the loading mechanism always sees much higher pressure. Since the mechanism that changes the setting of the valve in the present invention is on the pilot side of the valve, this mechanism sees much lower pressures than the existing valves. That makes it possible to change the setting of the valve slowly and with low hysteresis.

The general principal incorporated in the present invention involves limiting the pilot chamber pressure and rate of inlet pressure rise. This is accomplished in large part by positioning the variable spring loader mechanism in the very low pressure in the pilot chamber just sufficient to fully bias the pilot chamber spring to its maximum pressure setting. Moreover, the operating pressure at which the present invention opens slowly follows the actual pressure at the inlet port of the valve. At sudden pressure increase in the system when the inlet pressure exceeds the maximum valve setting, the valve opens until the setting and the actual pressure are equal again. Thus, assuming the flow does not exceed the capacity of the valve, the pressure at the valve inlet cannot rise faster than the operating pressure setting of the valve itself.

BRIEF SUMMARY OF THE INVENTION

The present invention is directed to a ventable, pilot-operated relief valve that limits the maximum pressure in a high pressure hydraulic system as well as controls the rate of pressure rise. By controlling the rate of pressure rise, this valve can minimize the potential for pressure spikes above the desired ultimate system operating pressure. This function, as well as the construction of the valve, are similar to the device described by U.S. Pat. Nos. 6,039,070 and 6,119,722 (both incorporated herein by reference thereto), one exception including the preferred addition of a third port which provides for a direct hydraulic connection to the hydraulic fluid volume between the damping orifice and the pilot seat. Through this third port, the internally generated pilot flow can be given a separate path to tank before entering the pilot chamber. Venting the valve in this way essentially short circuits the pilot section, resulting in a very low pressure setting determined by the bias pressure of the main section. Blocking this third port forces the pilot flow back into the pilot chamber, ultimately restoring the pressure adjustment section-determined pressure setting of the valve. This valve utilizes a hollow pilot piston as a moving pilot section that is hydraulically loaded to compress the pilot springs which, in turn, increase the relief setting of the valve. This pilot piston will continue to stroke and compress the pilot springs until either 1) the pilot setting of the valve reaches a pressure that is equivalent to the system pressure, or 2) the pilot piston reaches its mechanical stop, at which point the valve is limiting the maximum system pressure.

Another new aspect, applicable to many styles of relief valves, is the pilot section and includes a pilot ball holder of the pilot piston that is held off of the pilot seat when the pilot piston is in the starting position. This normally open pilot section allows the main piston to open immediately when pressure acting against the face of the main piston produces a force greater than the force exerted on the main piston by the main spring.

The valve will exhibit this condition at any pressure setting adjustment, meaning the valve will always begin relieving system pressure at a very low setting before ramping up to a desired set pressure. This feature is needed in a relief valve to allow oil leaving port 2 time to accelerate before the valve relieves at a high pressure setting. Softening the opening of the main section and allowing the return oil some time to accelerate greatly minimizes the potential for system and tank line pressure spikes. With typical relief valves, rapid increases in system pressure and flow can generate a shock wave in the system, ultimately absorbed by components, hoses, or fittings.

Once pilot flow is established, the pilot sleeve begins to stroke at a controlled rate, determined by the sizing of the control orifice leading into the adjustment chamber and the hydraulic pressure inside the pilot piston (limited by a small integral relief). As the piston strokes, the pilot piston and pilot ball approach the pilot seat and begins to modulate to control the setting of the valve at port 1. As pilot flow to the pilot section ceases (i.e. when the valve is vented), the pilot sleeve will return to the original starting position against the adjust screw of the adjustment section.

To ensure a full return to the starting position, a return spring has been added the pilot section between the ball holder and the pilot seat. This spring minimizes the potential for the pilot piston to stop short when returning to the starting position, which is especially important in the above example since the pilot springs are simply not long enough to return the pilot piston all the way back to the starting position.

This invention is thus directed to a pilot operated pressure valve which limits the rate of pressure rise and substantially eliminates excessive system pressure spikes. The valve includes an inlet in the main section, a hollow cylindrical outer housing sealingly connected at one end thereof to the main section, a pilot section having a chamber and a pilot sleeve slidably mounted within the outer housing, and an operating pressure adjustment section connected to another end of the outer housing adjacent another end of the pilot chamber for selecting a minimum operating pressure of the valve.

A main chamber receives pressurized fluid metered through a main orifice and discharges pressurized fluid through a damping orifice into the pilot chamber. Because the pilot ball downstream of the damping orifice is held off the pilot seat in the normal starting condition by a pilot return spring, the main section piston will open immediately when system pressure overcomes the low bias pressure of the main section spring. The main piston will open an exit port 2 upstream of the main orifice for discharging pressurized fluid from the valve back to a supply tank when inlet pressure exceeds the operating pressure. Pressurized fluid is also metered from the pilot chamber through a control orifice into a loading chamber to automatically further vary the operating pressure of the valve up to its maximum pressure setting. A relief port discharges pressurized fluid from said pilot chamber when fluid pressure there exceeds a relatively low pilot pressure.

It is therefore an object of this invention to provide an improved pilot operated pressure valve which genuinely exhibits a limitation of pressure spikes and a rate of pressure rise of the fluid pressure in a hydraulic system.

It is still another object of this invention to provide a pressure valve for a hydraulic system which limits the pressure within the system so as not to exceed the maximum pressure setting of the valve.

It is still another object of this invention to provide a pressure valve which limits the rate of pressure rise in a hydraulic system up to and not exceeding the maximum pressure setting of the valve.

It is yet another object of this invention to provide a pressure valve which exhibits the above features in various embodiments such as that of a pressure relief valve, a vented relief valve, a sequence valve, and a kick-down relief valve.

In accordance with these and other objects which will become apparent hereinafter, the instant invention will now be described with reference to the accompanying drawings.

DETAILED DESCRIPTION OF THE INVENTION

Figure 1:
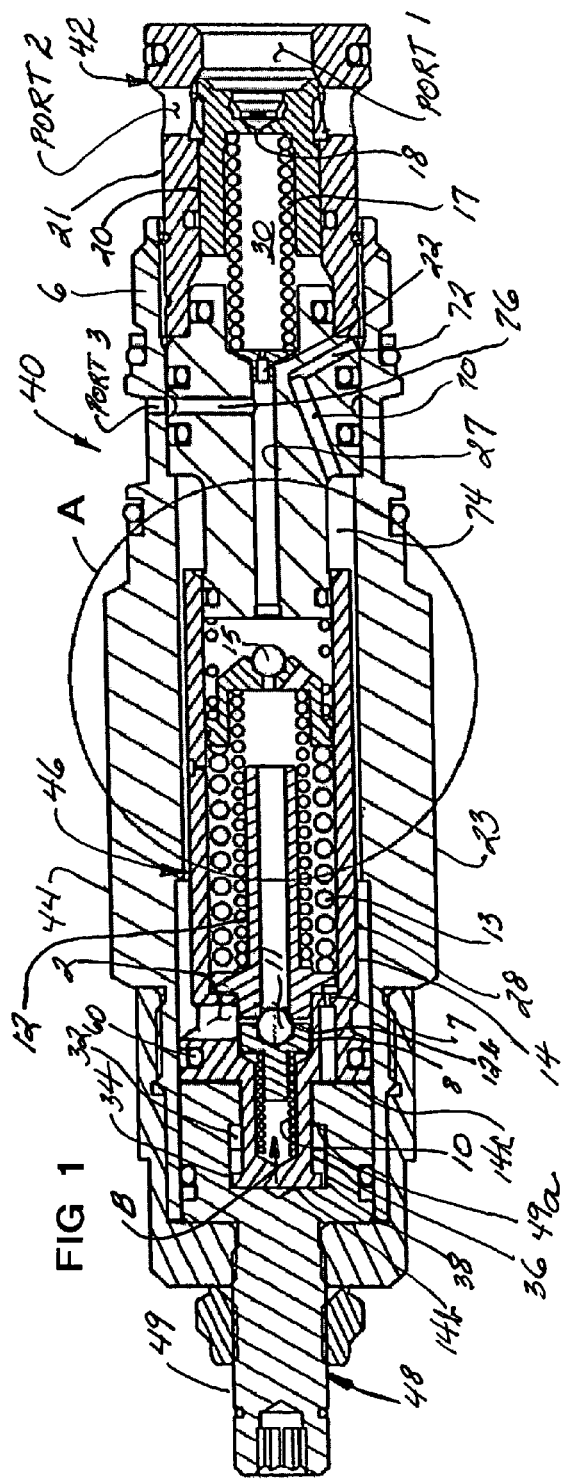
FIG. 1 is a side elevation section view of the preferred embodiment of the invention in the form of a vented relief valve.
Figure 3:
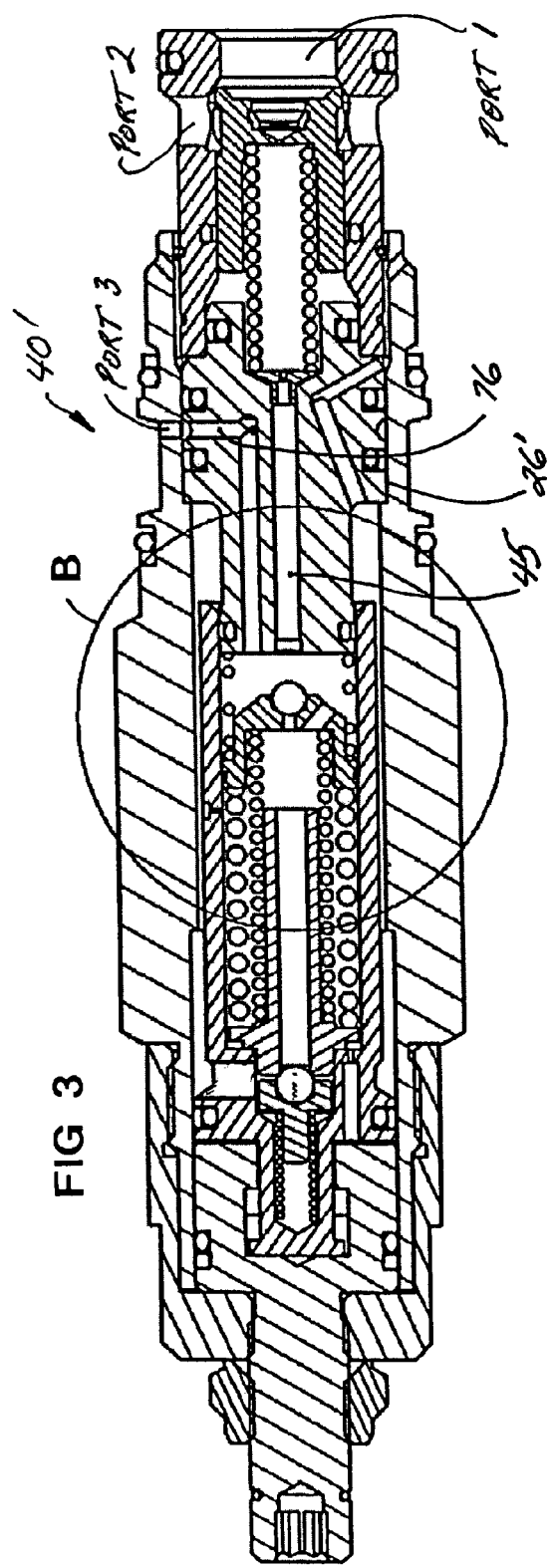
FIG. 3 is a side elevation section view of an alternate embodiment of the invention.

The present invention is shown generally in area A of FIG. 1 and area B of FIG. 3 and includes a normally open pilot section 46 which may be applied to any valve that can functionally accommodate a sliding pilot piston, e.g. 37 of a pilot chamber 24. The pilot ball 15 starts in a normally-open position before pilot flow enters the pilot piston 37 through passage 31. Once this flow is established, the pilot sleeve 14, and thus the pilot piston 37, strokes to load a pilot ball 15 against a pilot seat 38, compressing the pilot springs 13 and 33 until the pilot sleeve 14 reaches a mechanical stop 49a within the adjust screw 49 whereupon the maximum pressure setting is reached, or the effective pilot pressure generated by the pilot springs 13 and 33 acting on the pilot ball 15 is equivalent to the system pressure at port 1.

To ensure that the pilot sleeve 14 consistently returns to the starting position against the screw 49, a return spring 35 applies a return force during the entire stroke of the pilot piston 37. This return spring 35 acts directly on the pilot piston 37 and therefore directly opposes the pilot spring force used to determine the valve setting.

Regardless of the pressure setting applied through the adjustment of the screw 49, the threshold pressure of the valve remains low. This feature is unlike the prior art in which the threshold pressure adjusts with the maximum set pressure maintaining a constant difference. For any pressure setting of the valve, the initial threshold pressure will be equivalent to the main section bias pressure, i.e., the main section 42 alone determines the threshold pressure of the valve since the pilot section 46 is normally open.

Figure 2:
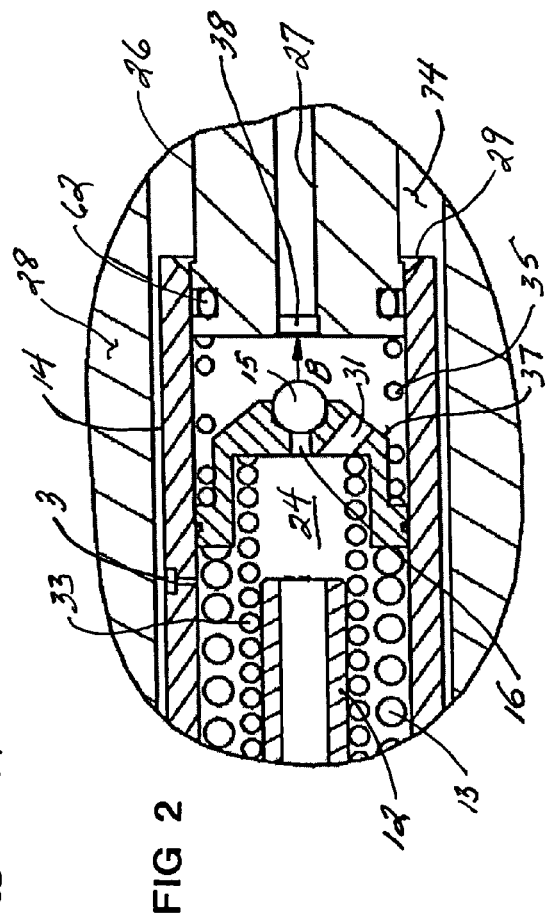
FIG. 2 is an enlargement of area A of FIG. 1.

Still referring to FIGS. 1 and 2, the preferred embodiment is shown generally at numeral 40. This pilot operated pressure valve 40 generally includes three major components, a main section 42, an elongated pilot section 46 and a pressure adjust section 48. An elongated outer housing 44 is sealably connected at one end thereof to, and longitudinally extending from, a proximal end of an inlet body 21 of the main section 42. The pilot section 46 includes a cylindrical pilot sleeve 14 which is slidably mounted for limited longitudinal movement within the outer housing 44 and forms the side walls of a pilot chamber 24. Pilot sleeve 14 is connected and longitudinally extends from a retainer 26 which is immovably held as part of, and longitudinally extending from, the inlet body 21. The pressure adjust section 48 is sealably and threadably connected to another end of the outer housing 44 and positioned at another end of the pilot section 46 as shown in FIG. 1.

In general, the main section 42 is structured to receive pressurized fluid at system pressure. A main chamber 30 receives metered fluid from inlet port 1 through a main orifice 18 and transfers fluid at a pilot flow rate from the main chamber 30 through a damping orifice 22 into the pilot chamber 24 through a longitudinal passage 27 in the retainer 26 and through passage 31. The main chamber 30, including a main spring 17, maintains the head of main piston 20 in a closed configuration shown in FIG. 1 wherein the outlet port 2 is sealed from fluid communication with the inlet port 1.

The pilot ball 15 is initially held away from the seat in retainer 26 by return spring 35. When the inlet pressure rises above the preset operating pressure of the valve, fluid flow through the main orifice 18 creates sufficient pressure drop across the main orifice 18 to overcome the main spring 17, whereupon pressurized hydraulic fluid will flow directly from inlet port 1 to outlet port 2 and then to a tank or reservoir at lower or zero pressure.

Pressurized fluid at inlet port 1 flows at a low pilot flow rate through the main orifice 18 positioned centrally at one end of the main piston 20. The preferred size of main orifice 18 is about 0.02" in diameter. When the main chamber 30 is filled with hydraulic fluid, the pressure in chamber 30 will generally equal that of the system pressure at port 1. The pressurized fluid also flows from the main chamber 30 through the damping orifice 22 positioned centrally within a longitudinal passage 27 of retainer 26 and into the pilot chamber 24 through passage 31. Thereafter, the entire pilot chamber 24 will be filled with pressurized fluid not exceeding a pre-established pilot chamber pressure of about 225 psi determined by a relief spring 10 acting against a relief ball 11 mating elongated pilot spring seat 12.

As pressurized fluid enters and fills the pilot chamber 24, air in the chamber, along with a very small amount of pressurized fluid is slowly discharged from a drain orifice 3 formed through the side of pilot sleeve 14 having a preferred diameter of 0.016", a diameter sufficiently small to prevent the main piston 20 from opening due only to fluid flow rate through the drain orifice 3. A clearance gap 28 is provided between the outer cylindrical surface of pilot sleeve 14 and the inner cylindrical surface of the outer housing 44 which directs fluid and air discharging from the drain orifice 3 from the valve through annular passage 74 to passages 70 and 72 in retainer 26 and through relief port 6 formed through the outer housing 44 adjacent one end thereof. The flow rate required to load the pilot chamber 24 to keep the valve set at the actual pressure at port 1 is lower than the flow required to move the main piston 20 against the main spring 17.

Pressurized fluid at the relatively low pilot chamber pressure, which cannot exceed that established by a relief spring 10 acting against a relief ball 11 and mating elongated pilot spring seat 12, additionally flows from the pilot chamber 24 through a control orifice 7 to fill a loading chamber 32. As pilot chamber fluid pressure increases, pilot sleeve 14 overcomes the compression force of return spring 35 and moves toward retainer 26 bringing pilot ball 15 into a seated position on the pilot seat. As the pilot sleeve 14 continues to move toward the retainer 26, the compression force exerted against the pilot spring 13 is increased and thus increases the pressure against the pilot ball 15. By this arrangement of sufficiently large differential area, the operating pressure required within the main chamber 30 to keep the pilot ball 15 unseated increases with pilot spring pressure to adjust the operating pressure of the valve toward its maximum setting. Thus, the minimum operating pressure is established by the pressure bias of the main section 42 when the pilot ball 15 is disengaged from the pilot seat 38 by the contact of flange 34 of relief spring housing 36 within the loading chamber 32 in the position shown, while the maximum operating pressure of the valve is established when the flange 34 and pilot sleeve 14 move to the opposite end of the loading chamber 32 in the direction of arrow B as pilot pressure is increased. When flow to the valve has ceased, pilot piston 37 returns to a starting position by way of compression force from pilot springs 13 and 33 and by return spring 35.

Note importantly that the velocity at which the sleeve 14 moves to a maximum pilot spring preload setting is determined by the rate of fluid flow through the control orifice 7. Moreover, the fluid pressure build-up in the pilot chamber 24 preloads the pilot spring 13 to a pressure setting of the valve 40 which equals the instantaneous pressure at inlet port 1.

EXAMPLE 1

In the preferred embodiment, the effective area for the pilot pressure to act upon is with respect to the open end surface 29 of the sleeve 14 which defines a differential ring area. The outer diameter of the sleeve 14 is 0.747"; the inner diameter of the sleeve 14 and the outer diameter of the retainer 26 is 0.500". The differential area, therefore, is about 0.242 sq. inch. That means a pilot chamber pressure of 225 p.s.i. exerts a force of about 54 lbs. against pilot piston 37 which is exerted against the pilot ball 15. The pilot ball seat diameter is 0.092" which defines an effective area of 0.0066 sq. inch. The pilot spring force of 54 lbs. spring force sets the valve at an operating pressure of 8181 p.s.i. The pressure in the pilot chamber 24 of 225 p.s.i. is additive to this setting so that the theoretical maximum operating pressure setting of the valve is about 8400 p.s.i. The actual maximum pressure is limited by the spring load, the pilot springs 13 and 33 apply to the pilot ball 15 at the full stroke of the pilot sleeve 14 at maximum adjustment of the adjust screw 49.

The details of the structure of the present invention shown in enlarged area A of FIG. 2, provides the actual "soft start" functional benefits of this invention. When the pilot chamber 24 is substantially filled with pressurized fluid, a force is exerted to unseat relief ball 11 against pilot spring 10 from its seated and sealed position shown. This maximum pilot chamber pressure is preferably about 225 p.s.i. The fluid pressure rise in the pilot chamber 24 up to this relief valve ball 11 opening pilot pressure automatically adjusts further compression of the pilot spring 13 as previously described. When the relief ball 11 is unseated when the pilot pressure in the pilot chamber 24 is reached, the pressurized fluid will flow from the pilot chamber 24 through a crosshole 2, along the clearance gap 28 between the pilot sleeve 14 and the outer housing 44 for discharge from the valve through relief port 6. By this arrangement, pilot pressure within the pilot chamber 24 can never exceed the effective preset pilot pressure of about 225 p.s.i., made just sufficient to fully preload the pilot spring 13 to its maximum setting wherein flange 34 within loading chamber 32 is moved to the maximum displacement in the direction of arrow B in FIG. 2. Thus, the order of magnitude ratio between operating and pilot pressures is at least about 10 to 1 and preferably as high as about 25 to 1.

To vary the maximum operating pressure setting of the valve 40, the pressure adjust section 48 is threadably moveable longitudinally or axially of the valve 40 to move the sleeve 24 correspondingly. This sleeve movement varies the initial proximity of the pilot ball 15 to the pilot seat and the potential compression load of the pilot chamber spring 13 and the proportionately varied load against the pilot ball 15.

In summary, the present invention limits the rate of pressure rise within an adjustable operating pressure range and further limits the maximum pressure within the valve and the system in which it is connected. Because of this pressure rate increase limitation, pressure spikes or hydraulic shock are also eliminated by the valve. The valve operating pressure at which the valve will open slowly follows the actual pressure at the inlet port 1. At sudden pressure increase above operating pressure, the valve opens to allow pressurized fluid to discharge through port 2 until such time as the operating pressure of the valve and the actual inlet pressure are again equal. Moreover, unless the fluid flow into the valve exceeds the capacity of the valve itself, the pressure cannot rise faster than the operating pressure setting of the valve.

As in other pilot operated relief valves, this valve has a low pressure in the pilot chamber. For the soft start mechanism, this is important in three respects:
  a. The maximum pressure drop across the orifice 7 is only 225 p.s.i. That means a low consistent flow into the loading chamber 32 which distinguishes this "soft start" valve from other soft start valves. Other valves typically have up to 6000 p.s.i. pressure differential across the orifice that controls the shift of the piston or pilot sleeve that determines the valve setting. This rate of flow into the loading chamber through orifice 7 determines the rate at which the setting of the valve changes. The rate of setting change equals the rate of pressure rise at port 1;
  b. The seals 60 and 62 near each end of the sleeve section 46 see a pressure drop of only 225 p.s.i. maximum as compared to up to 6000 p.s.i. in other designs, a factor of about 27. This translates into significantly lower friction and lower hysteresis of the present invention over other such prior art valves.
  c. The pilot pressure also determines the fluid losses while the valve is active. Assuming that the pressure at port 1 is within the range where the valve limits the rate of pressure rise, the valve then adjusts it's setting to the actual pressure at port 1. It does so by pressurizing the pilot chamber. A pressurized pilot chamber causes a pilot flow out through orifice 3. The lower the pressure in the pilot chamber, the lower the fluid losses.

Figure 5:
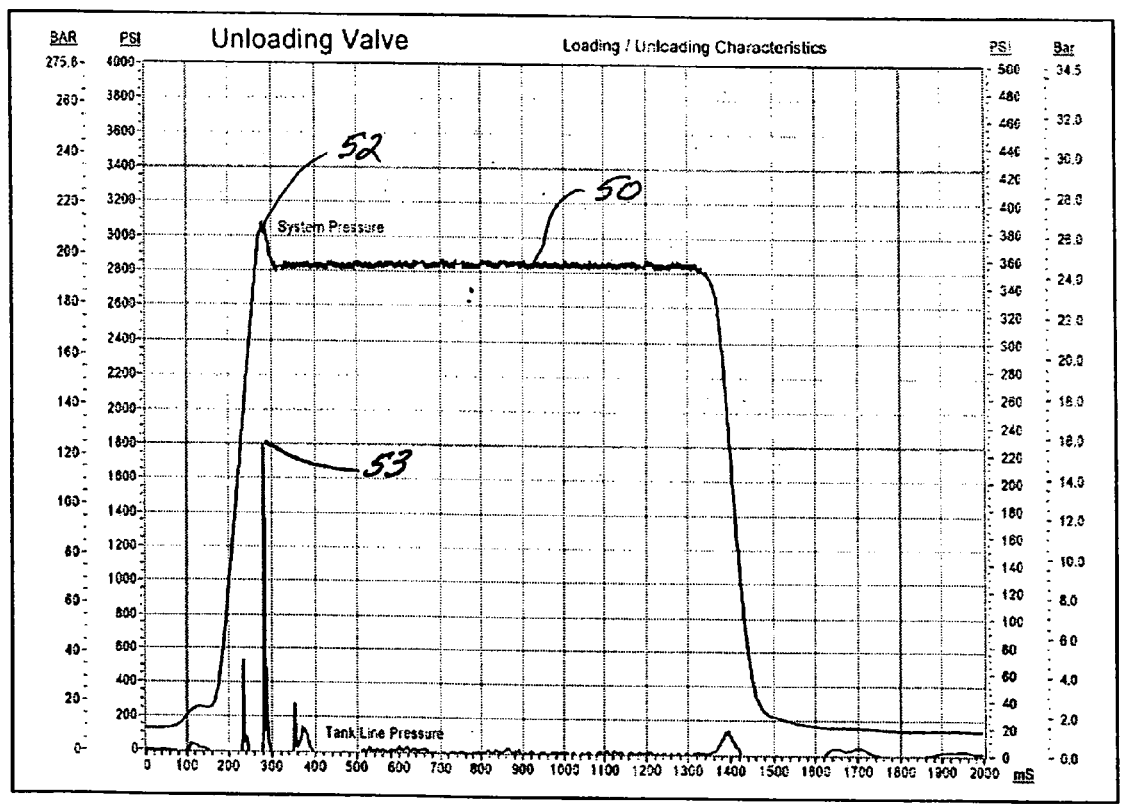
FIG. 5 is a typical recorded fluid pressure rise vs. time plot of fluid pressure at the inlet of a conventional pressure valve.
Figure 6:
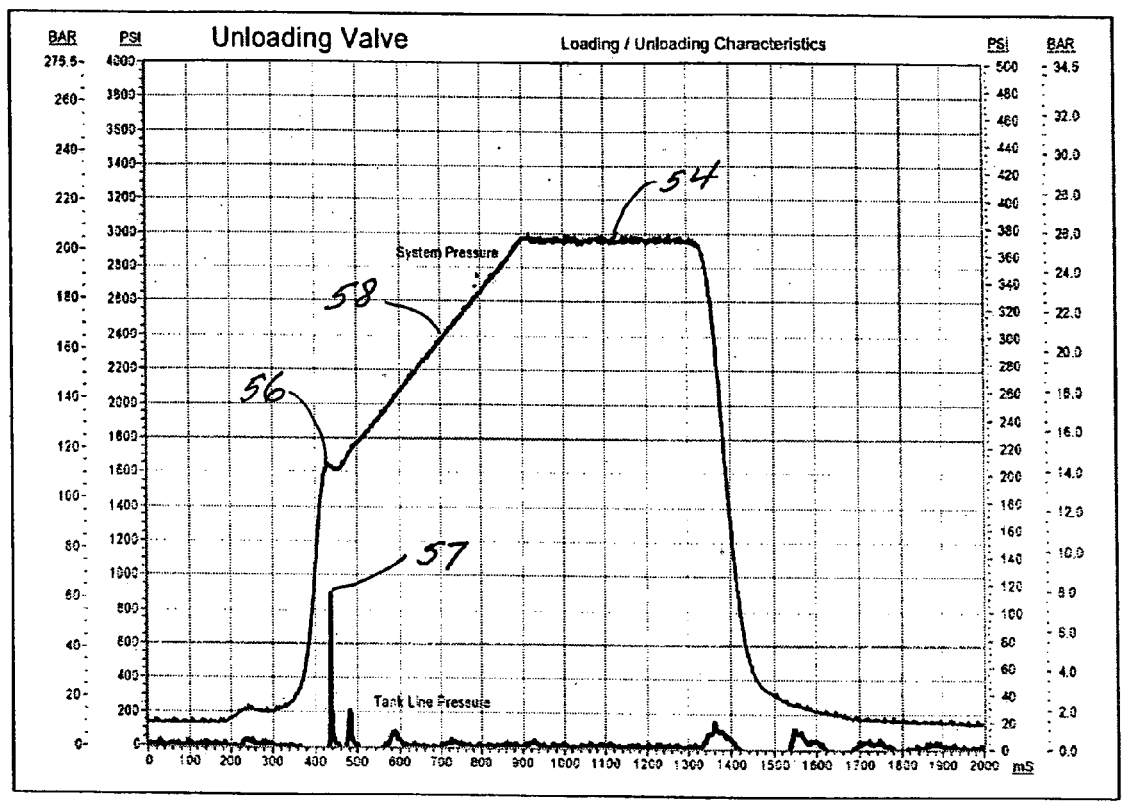
FIG. 6 is a recorded fluid pressure versus time plot at the inlet of the pressure valve in U.S. Pat. No. 6,039,070.
Figure 7:
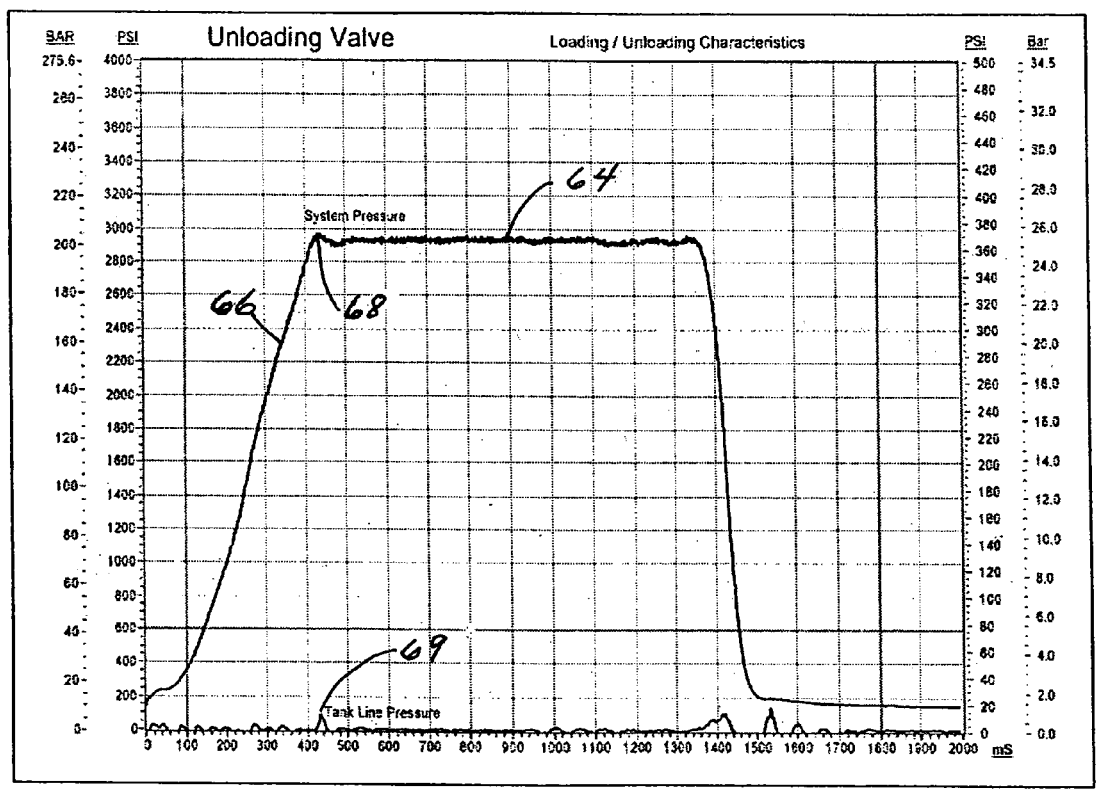
FIG. 7 is a recorded fluid pressure vs. time plot similar to that of FIG. 6 of the present invention.

FIGS. 5, 6 and 7 depict the functional improvements resulting from the new design feature as compared to two iterations of prior art. The valves used for the comparison were three port ventable relief valves, although the comparison could have been conducted with a variety of other valves (i.e. relief valves, sequence valves, etc.)

Referring first to FIG. 5, a typical prior art ventable pressure relief valve without the soft start mechanism of the present invention was actually tested. FIG. 5 displays system pressure and tank line pressure in a small circuit consisting of a pump and a standard spool-type ventable relief valve. The curves show that when system pressure reaches the valve setting, a pressure spike can be generated in the tank line at 53 as well as in the system at 52. The operating pressure of the valve is shown at 50 to be approximately 2800 p.s.i. The test begins with the vented relief valve in the vented state, passing pump flow directly to tank at low pressure. The pressure increase is initiated by blocking the vent, resulting in the pump flow returning to tank at the valve setting 50. Even though pressure increases with the main section of the relief open, the system pressure spikes over the valve setting since the pilot section of the valve is closed until the set pressure is reached, i.e. the valve has no real control over the rate of system pressure increase.

In FIG. 6, the invention described in U.S. Pat. No. 6,039,070 was subjected to the same fluid pressure inlet condition, this valve having an operating pressure shown at 54 at about 3000 p.s.i. FIG. 6 displays system pressure at 54 and tank line pressure in a small circuit consisting of a pump and a soft-shift, ventable relief valve (as described by patents of prior art). In this circuit, the rate of rise 58 in system pressure is limited by the soft-style relief valve, ultimately preventing the typical pressure spike in the system. The pressure spike in the tank line at 57 is reduced as the relief valve begins opening at a pressure lower than the ultimate set pressure 54, referred to as the threshold pressure 56. The threshold pressure 56 is depicted on the curve as the point where the system pressure begins to ramp up slowly. Although a pressure spike occurred, it only reached about 1650 p.s.i., well below the intended operating pressure at 54. The pressure rise shown at 58 was a gradual increase on a uniformly increasing pressure level basis. This pressure rise 58 occurred after the pilot ball 15 was unseated and the fluid in the pilot chamber 24 as the pilot pressure was rising and adjusting the operating pressure setting of the valve to its maximum. Thus, all system shock and damaging excessive fluid pressure has been eliminated by the '070 invention.

The present invention 40 or 40' described by FIG. 7, includes a pump and a modified, soft-shift ventable relief valve with a normally open pilot section as above described. In this case, the threshold pressure is kept to a minimum, by ensuring the pilot stage remains normally open at all possible set pressure adjustments, and the system pressure 64 begins a controlled ramp at 66 up as soon as it overcomes the bias spring in the main section. By controlling the rate of pressure rise from such a low pressure, the circuit sees no abrupt changes in the return flow velocity. Therefore, the system pressure spike 68 is once again virtually eliminated, but this time, the tank line pressure spike 69 is virtually eliminated as well.

Alternate Embodiments

The basic structure of the present invention as above described may be modified within the intended scope of this invention. One such alternate embodiment shown in FIGS. 1 and 2 is in the form of a vented relief valve achieved by adding another exit port in the outer housing 44, pilot bypass port 3, which is in fluid communication with a cross passage 76 positioned in fluid communication with the longitudinal passage 27 between the damping orifice 22 and the pilot chamber 24. This produces a very low crack or opening pressure of the piston 20 to exit port 2, depending upon the preload of the main spring 17. Since this valve 40 would be vented downstream of the damping orifice 22, a second pilot relief valve at port 3 counld be used as a remote control. By selectively closing port 3, the setting of the valve rises quickly to the minimum pressure setting as above described. If the pressure at the inlet port 1 rises further, the valve limits the rate of pressure rise again as previously described.

Figure 4:
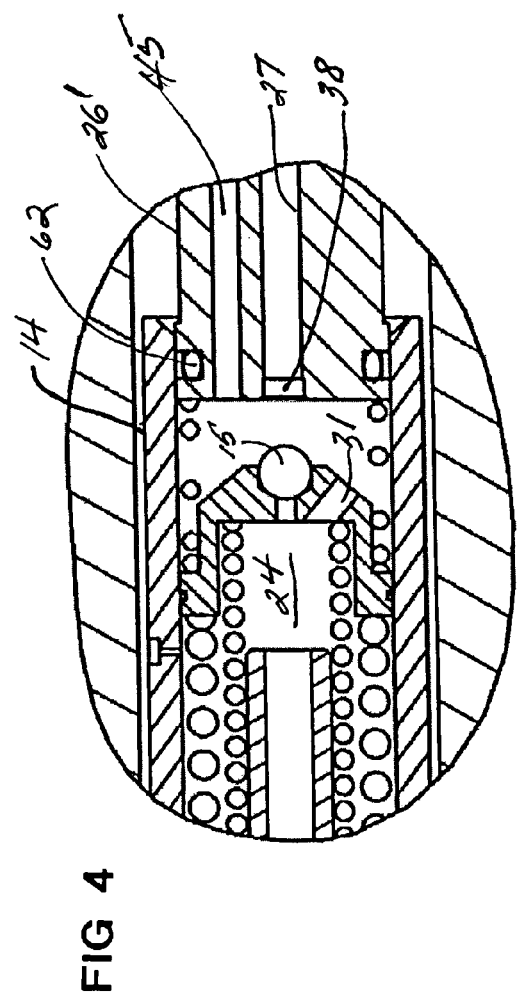
FIG. 4 is an enlargement of area B of FIG. 3.

FIGS. 3 and 4 display an alternate version of the vented relief valve that vents the system pressure at port 1 through the pilot chamber 24 and out pilot port 3, allowing the inlet section 42 to open a path from port 1 to port 2. While port 3 is connected to tank allowing pilot flow directly back into the reservoir, the inlet section 42 relieves system pressure at a value equivalent to the main spring 17 bias acting on the main piston 20. Pilot pressure seen at port 3 can never exceed the relief setting of the integral relief within the pilot piston 37. Similarly, pressure at port 3 can only decay as quickly as the pressure within the pilot chamber 24.

Still another alternate embodiment of the present invention is in the form of a kick-down relief valve which would incorporate a crosshole extending from the main chamber 30 to the seating surface of the piston 20. This embodiment would also eliminate the main orifice 18 so that this valve would open and stay open if the pressure rise at the inlet port exceeds the maximum rate of pressure rise of the valve. The valve would remain open once it is opened because the proposed crosshole in the piston sees the pressure much lower than the pressure at port 1 because of the high rate of fluid flow across the end of the crosshole as fluid moves between port 1 and port 2.

Because all of these alternate embodiments incorporate the relief valve arrangement at the opposite end of the pilot chamber as shown and described in FIG. 2, they also possess this actually realized "soft start" feature with no excessive start-up pressure spikes above the operating pressure of the valve.

A still further alternate embodiment of the invention is in a form which incorporates the essential aspects of this invention to pilot operate an external main stage. To accomplish this, the main chamber 30 of this invention would be connected to the main chamber of a conventional pilot operated relief valve. The invention itself could be built without the main stage, i.e. without the main piston 20, the spring 17, the damping orifice 22 and without crossholes in the outer housing 44.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A pilot operated pressure valve comprising:
   a main section, an elongated cylindrical hollow outer housing sealingly connected at one end thereof to and longitudinally extending from said main section, an elongated pilot section having a pilot chamber and being mounted within a cylindrical interior of said outer housing and longitudinally extending at one end thereof from said main section, and a pressure adjust section adjustably sealingly connected to another end of said outer housing at another end of said pilot section and defining a loading chamber between said pilot section and said pressure adjust section;

said main section including an inlet port at one end thereof, an outlet port, a retainer sealingly connected to another end of said main section, a main piston slidably mounted within said main section, and a main spring positioned within and extending longitudinally along a main chamber formed centrally between said retainer and said main piston;

a head of said main piston defining one end of said main chamber and including a main orifice adjacent said inlet port which allows a relatively small quantity of pressurized fluid at said inlet port to be metered into and to fill said main chamber;

said retainer including a longitudinally extending passage having a pilot seat at one end and a damping orifice at another end thereof, said damping orifice in fluid communication with said main chamber for allowing a relatively small quantity of pressurized fluid in said main chamber to be metered into said pilot chamber from said main chamber;

said main spring biasingly urging said main piston into sealing engagement against said inlet port until a predetermined inlet pressure is reached equal to a threshold pressure of said valve whereupon said main piston is opened by axial movement thereof against said main spring to allow pressurized fluid to enter said inlet port and to exit said valve directly from said outlet port;

said pilot section including an elongated pilot spring acting at one end thereof within an elongated pilot sleeve of said pilot section against a pilot piston held for sliding translation within said pilot sleeve and supporting a pilot ball held from said pilot seat by a return spring acting between said pilot piston and said one end of said retainer, said pilot piston moving said pilot into a partially sealed position against said pilot seat when pressure in said pilot chamber exceeds a predetermined minimum pressure wherein inlet pressure increases to the operating pressure;

said pilot sleeve longitudinally positionable by said pressure adjust section within said outer housing to vary a length of said pilot spring and thus to vary operating pressure;

said pilot sleeve including a crosshole closed to fluid communication with said pilot chamber by a relief ball held biasingly, longitudinally slidably positionable within said pilot chamber, one end of said pilot sleeve including a control orifice which allows a relatively small quantity of pressurized fluid in said pilot chamber to be metered therefrom into fill said loading chamber;

said loading chamber having a net surface area greater than that of said retainer whereby said pilot sleeve is moveably urged against said pilot spring to vary the valve operating pressure between the threshold pressure and a maximum valve operating pressure.

2. A pilot operated pressure valve as set forth in claim 1, further comprising:
   said retainer including a cross passage in sealed alignment with a pilot bypass port formed through said outer housing, said cross passage in fluid communication with said pilot chamber and inlet downstream of said damping orifice for allowing pressurized fluid to exit said valve from said pilot bypass port wherein the operating pressure of said valve is reduced.

3. A pilot operated pressure valve comprising:

a main section, an elongated cylindrical hollow outer housing sealingly connected at one end thereof to and longitudinally extending from said main section, an elongated pilot section having a pilot chamber and being mounted within a cylindrical interior of said outer housing and longitudinally extending at one end thereof from said main section, and a pressure adjust section adjustably sealingly connected to another end of said outer housing at another end of said pilot section and defining a loading chamber between said pilot section and said pressure adjust section;

said main section including an inlet port at one end thereof, an outlet port, a retainer sealingly connected to another end of said main section, a main piston slidably mounted within said main section, and a main spring positioned within and extending longitudinally along a main chamber formed centrally between said retainer and said main piston;

a head of said main piston defining one end of said main chamber and including a main orifice adjacent said inlet port which allows a relatively small quantity of pressurized fluid at said inlet port to be metered into and to fill said main chamber;

said retainer including a longitudinally extending passage having a pilot seat at one end and a damping orifice at another end thereof, said damping orifice in fluid communication with said main chamber for allowing a relatively small quantity of pressurized fluid in said main chamber to be metered into said pilot chamber from said main chamber;

said main spring biasingly urging said main piston into sealing engagement against said inlet port until a predetermined inlet pressure is reached equal to a threshold pressure of said valve whereupon said main piston is opened by axial movement thereof against said main spring to allow pressurized fluid to enter said inlet port and to exit said valve directly from said outlet port;

said pilot section including an elongated pilot spring acting at one end thereof within an elongated pilot sleeve of said pilot section against a pilot piston held for sliding translation within said pilot sleeve and supporting a pilot ball held from said pilot seat by a return spring acting between said pilot piston and said one end of said retainer, said pilot piston moving said pilot into a partially sealed position against said pilot seat when pressure in said pilot chamber exceeds a predetermined minimum pressure wherein inlet pressure increases to the operating pressure;

said pilot sleeve longitudinally positionable by said pressure adjust section within said outer housing to vary a length of said pilot spring and thus to vary operating pressure.

4. A pilot operated pressure valve as set forth in claim 3, further comprising:

said retainer including a cross passage in sealed alignment with a pilot bypass port formed through said outer housing, said cross passage in fluid communication with said pilot chamber and inlet downstream of said damping orifice for allowing pressurized fluid to exit said valve from said pilot bypass port wherein the operating pressure of said valve is reduced.

5. In a pilot operated pressure valve comprising an elongated main section, an elongated cylindrical hollow outer housing sealingly connected at one end thereof to and longitudinally extending from said main section, an elongated pilot section having a pilot chamber and being mounted within a cylindrical interior of said outer housing and longitudinally extending at one end thereof from said main section, and a pressure adjust section adjustably sealingly connected to another end of said outer housing at another end of said pilot section, said main section including an inlet port at one end thereof, an outlet port, a retainer sealingly connected to another end of said main section, a main piston slidably mounted within said main section, and a main spring positioned within and extending longitudinally along a main chamber formed centrally between said retainer and said main piston, a head of said main piston defining one end of said main chamber and including a main orifice adjacent said inlet port which allows a relatively small quantity of pressurized fluid at said inlet port to be metered into and fill said main chamber, said retainer including a longitudinally extending damping orifice in fluid communication with said main chamber which allows a relatively small quantity of pressurized fluid in said main chamber to be metered into said pilot chamber from said main chamber, said main spring biasingly urging said main piston into sealing engagement against said inlet port until a predetermined inlet pressure equal to a maximum operating pressure of said valve is reached whereupon said main piston is opened by axial movement thereof against said main spring to allow pressurized fluid to enter said inlet port and to exit said valve directly from said outlet port, said pilot section including an elongated pilot spring acting at one end thereof within an elongated pilot sleeve of said pilot chamber member, the improvement comprising:

said pilot section including an elongated pilot spring acting at one end thereof within an elongated pilot sleeve of said pilot section against a pilot piston held for sliding translation within said pilot sleeve and supporting a pilot ball held from said pilot seat by a return spring acting between said pilot piston and said one end of said retainer, said pilot piston moving said pilot into a partially sealed position against said pilot seat when pressure in said pilot chamber exceeds a predetermined minimum pressure wherein inlet pressure increases to the operating pressure;

said pilot sleeve longitudinally positionable by said pressure adjust section within said outer housing to vary a length of said pilot spring and thus to vary operating pressure.

6. The improvement of claim 5, further comprising:

said retainer including a cross passage in sealed alignment with a pilot bypass port formed through said outer housing, said cross passage in fluid communication with said pilot chamber and inlet downstream of said damping orifice for allowing pressurized fluid to exit said valve from said pilot bypass port wherein the operating pressure of said valve is reduced.

* * * * *